Aug. 11, 1964 I. S. BLONDER 3,144,625
ATTENUATOR SYSTEM HAVING END-TERMINATED DISSIPATIVE LONG
LINE WITH INPUT AND OUTPUT TAPS MOVABLE
SYMMETRICALLY TO MID POINT
Filed Feb. 8, 1963 2 Sheets-Sheet 1

INVENTOR
ISAAC S. BLONDER
BY Rines and Rines
ATTORNEYS

Aug. 11, 1964 I. S. BLONDER 3,144,625

ATTENUATOR SYSTEM HAVING END-TERMINATED DISSIPATIVE LONG LINE WITH INPUT AND OUTPUT TAPS MOVABLE SYMMETRICALLY TO MID POINT

Filed Feb. 8, 1963 2 Sheets-Sheet 2

INVENTOR
ISAAC S. BLONDER

BY Rines and Rines

ATTORNEYS

United States Patent Office 3,144,625

Patented Aug. 11, 1964

3,144,625

ATTENUATOR SYSTEM HAVING END-TERMINATED DISSIPATIVE LONG LINE WITH INPUT AND OUTPUT TAPS MOVABLE SYMMETRICALLY TO MID POINT

Isaac S. Blonder, West Orange, N.J., assignor to Blonder-Tongue Electronics, Newark, N.J., a corporation of New Jersey Filed Feb. 8, 1963, Ser. No. 257,191
7 Claims. (Cl. 333—81)

The present invention relates to attenuator systems and, more particularly, to electrical networks adapted to permit successive predetermined amounts of signal attenuation to be inserted into a circuit that is operable over wide signal-frequency bands.

Among the most widely used network attenuators are those embodying cascaded ladder-type resistor networks into one input end of which signals-to-be-attenuated are fed and out of the other output end of which the signals passed through and attenuated by all the networks are extracted. Variable attenuation is achieved by moving the input only to successive networks from the input end. The problems of wide frequency-band matching for such input variation, particularly at high frequencies of the order of the UHF band and the like, where the series resistor elements of the networks introduce substantial capacitive reactance, have required special compensatory circuit elements, with attendant disadvantageous increases in the size and cost of the attenuator device.

It is to the solution of this problem that the present invention is primarily directed; it being an object of the invention to provide a new and improved variable attenuator system that shall permit wide frequency-band matching with a compact and relatively simple network construction.

A further object is to provide a novel attenuator of general utility embodying, in summary, a pair of back-to-back connected ladder-type networks.

Figure 1:
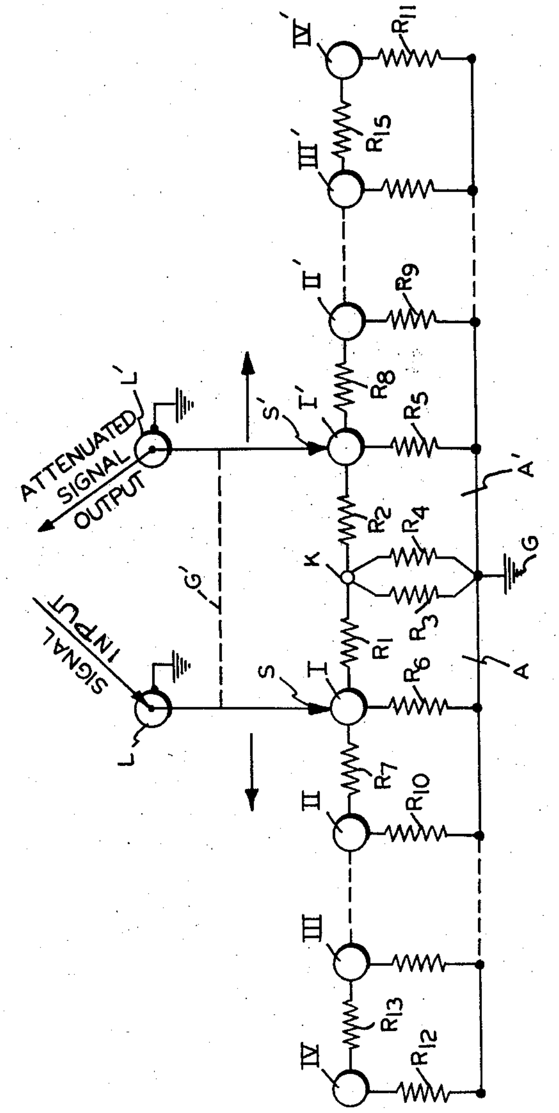
Figure 2:
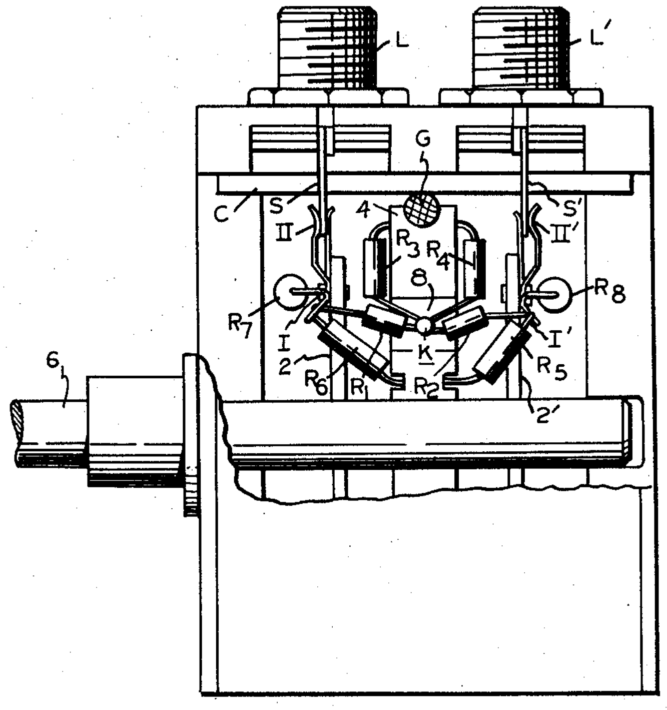

Other and further objects will be explained hereinafter and will be more particularly pointed out in connection with the appended claims; the invention now being described in conjunction with the accompanying drawing, FIG. 1 of which is a schematic circuit diagram of a preferred embodiment thereof; and FIG. 2 is a partial longitudinal section of an apparatus employing the circuit of FIG. 1.

In accordance with the invention, there is provided a pair of substantially symmetrical similar ladder-type networks A, A′, connected back-to-back at K–G in parallel with one another, to provide a characteristic impedance, such as 75 ohms, that is one-half that of each network ladder. The terminal G represents a ground plane. The network A comprises the cascaded $\pi$-type resistor networks $R_3$–$R_1$–$R_6$, $R_6$–$R_7$–$R_{10}$ . . . etc. extending to the left from terminals K–G and terminating in resistor $R_{12}$, which is of value representing the parallel combination of the last $\pi$-network shunt resistor and the characteristic impedance of the network. For the above example, the network shunt resistance may be about 530 ohms which, when paralleled with the 150-ohm impedance of the network ladder A, provides a resultant terminating resistance $R_{12}$ of about 117 ohms. The individual network series resistance elements $R_7$ . . . $R_{13}$, etc., for this example, may have values of about 100 ohms. The same remarks apply to the similar ladder A′ comprising networks $R_4$–$R_2$–$R_5$, $R_5$–$R_8$–$R_9$ . . . etc. extending from the common terminals K–G to the right, and terminating at $R_{11}$. At the back-to-back common terminals K–G, the ladder networks A, A′ are thus connected in parallel, so that, in the illustration, above, the impedance presented is 75 ohms.

Successive contact terminals I, II . . . III, IV (ladder A) and I′ II′ . . . III′, IV′ (ladder A′) are exposed to permit variable adjustment of the attenuator. The present invention employs variable signal input and output contact-member taps, shown at S and S′, that contact the contact terminals of respective ladder networks A, and A′ and relatively move in unison with respect thereto, in opposite directions to the left and right, respectively, away from the common terminal K. Thus, input coaxial transmission line L is shown connected at S to the terminal I, and the output line L′ that passes out the signal attenuated by the center networks $R_3$–$R_1$–$R_6$ and $R_4$–$R_2$–$R_5$ of the respective ladders A and A′, is connected at S′ to the terminal I′. These center networks may, for example, each provide 2 decibels of attenuation which, when added to the —3 decibel loss inherent in the connection of the lines L–L′, provides a first 10-decibel insertion loss. Successive 10-decibel insertions may be achieved by adjusting the succeeding $\pi$-sections $R_5$–$R_8$–$R_9$ . . . of ladder A′ and $R_6$–$R_7$–$R_{10}$ of ladder A to introduce 5-decibels of attenuation each. As contact members S and S′ are thus moved, in opposite directions away from the common terminal K and relative to the ladder contact terminals, to respective contact terminals II and II′, a second 10-decibels of attenuation will be introduced. It will thus be evident that the series capacitance of the $\pi$-section elements, at the higher frequencies, becomes markedly reduced; and successive 10-decibel units of attenuation may be readily introduced.

In order to provide isolation and shielding of the pair of ladder network systems A, A′ and facile relative movement of the contact members S, S′ and the ladder terminals I, I′, II, II′, etc., the network elements may be mounted on opposite faces of a conductive ground-plane disc 4, FIG. 2, carried by a rotatable shaft 6. Thus, resistor elements $R_3$, $R_1$, $R_6$ and $R_7$ are shown mounted at the left side of disc 4, and elements $R_4$, $R_2$, $R_5$ and $R_8$ are mounted on the right. The disc 4 is maintained at ground potential by the peripheral braid brush ring, labelled with the ground terminal connection reference letter G, contacting the housing chassis C. The common terminal K is shown inserted within an aperture 8 within the conductive disc 4, providing isolation of the ladders and ground symmetry of the ladder networks A and A′ extending therefrom.

The ladder contact terminals are shown in the form of clip terminals I, II . . . and I′, II′ . . . etc., distributed at equal angular intervals along respective insulating discs 2, 2′, coaxially mounted on the shaft 6 on opposite sides of the ground disc 4. The clip terminals I, II . . . and I′, II′ . . . etc. engage the fixed contact members S and S′ of input and output lines L, L′, providing the relative movement thereof along the successive ladder contact terminals, before described. Alternatively, the members S and S′ could rotate about the ladder networks, but the above construction is deemed preferable, with successive angular advancements of the shaft 6, relatively moving contact members S and S′ and the ladder contact terminals to effect unison advancement from terminals I–I′, to II–II′, to III–III′, etc., inserting successive units (tens of decibels in the above example) of attenuation, as desired.

Further modifications will occur to those skilled in the art and all such are considered to fall within the spirit and scope of the invention as defined in the appended claims.

What is claimed is:

1. A wide-band signal attenuator system having, in combination, a pair of similar network ladder attenuators each having successively connected cascaded $\pi$-networks of series and shunt impedance elements, one end of both network ladders being connected together back-to-back at common termnials to provide thereat a resultant predetermined characteristic impedance and each network having contact terminals connected to the junctions of the said series and shunt impedance elements thereof, a pair of input-signal and output transmission lines each of the said characteristic impedance and each having a contact member for engaging the contact terminals of a corresponding network ladder, and means for relatively moving the contact members of both lines and the said corresponding network ladder contact terminals to successive contact members spaced away from the said common terminals along the corresponding network ladders.

2. An attenuator system as claimed in claim 1 and in which the back-to-back-connected $\pi$-networks of each ladder are adjusted to introduce substantially 2 decibels of attenuation and succeeding $\pi$-networks of each ladder, substantially 5-decibels each.

3. An attenuation system as claimed in claim 1 and in which the ratios of the said resultant characteristic impedance to each of the series and shunt impedance elements of a plurality of the $\pi$-networks is substantially 75:100 and 75:530.

4. An attenuator system as claimed in claim 3 and in which each ladder is terminated in a resultant terminating impedance having the ratio to the said resultant characteristic impedance of substantially 117:75, with each ladder having its own independent characteristic impedance of substantially twice that of the said resultant characteristic impedance.

5. An attenuator system as claimed in claim 1 and in which the said elements of each network ladder are mounted on opposite sides of a conductive disc provided with brush means for grounding the disc and aperture means for receiving the said common terminals therein.

6. An attenuator system as claimed in claim 5 and in which the said contact terminals of the pair of network ladders are mounted upon a corresponding pair of further discs coaxially disposed on opposite sides of the said conductive disc, and common shaft means is provided for rotating the discs.

7. An attenuator system as claimed in claim 6 and in which the said contact members of each line are mounted to be engaged by the successive contact terminals upon each of the further respective discs during successive rotational adjustments of the said shaft means.

References Cited in the file of this patent

UNITED STATES PATENTS

| | | |
|---|---|---|
| 1,483,179 | Jammer | Feb. 12, 1924 |
| 1,530,633 | Whiting | Mar. 24, 1925 |
| 2,125,612 | Herbst et al. | Aug. 2, 1938 |
| 3,015,790 | Eisaman et al. | Jan. 2, 1962 |

FOREIGN PATENTS

| | | |
|---|---|---|
| 549,854 | Germany | May 18, 1930 |